United States Patent
Fulks et al.

(10) Patent No.: US 6,744,360 B2
(45) Date of Patent: Jun. 1, 2004

(54) METHOD OF CALIBRATING AN INTELLIGENT INPUT PUSH ROD ASSEMBLY

(75) Inventors: Gary C. Fulks, Spring Valley, OH (US); Douglas E. Poole, Dayton, OH (US); Michael C. Pfeil, South Charleston, OH (US)

(73) Assignee: Delphi Technologies, Inc., Troy, MI (US)

( * ) Notice: Subject to any disclaimer, the term of this patent is extended or adjusted under 35 U.S.C. 154(b) by 234 days.

(21) Appl. No.: 09/941,225

(22) Filed: Aug. 28, 2001

(65) Prior Publication Data

US 2003/0048182 A1 Mar. 13, 2003

(51) Int. Cl.[7] .................................................. B60Q 1/44
(52) U.S. Cl. .............................. 340/479; 701/70; 303/3
(58) Field of Search ........................... 340/479; 701/70, 701/29, 35; 303/3

(56) References Cited

U.S. PATENT DOCUMENTS

| | | | |
|---|---|---|---|
| 2,602,662 A | 7/1952 | Kintzinger | 267/1 |
| 2,735,268 A | 2/1956 | Stelzer | 60/54.6 |
| 3,226,990 A | 1/1966 | Pigeroulet | 74/110 |
| 4,309,934 A | 1/1982 | Volkmar et al. | 91/373 |
| 4,517,055 A | 5/1985 | Dove | 162/344 |
| 5,556,173 A * | 9/1996 | Steiner et al. | 303/3 |
| 5,772,290 A * | 6/1998 | Heibel et al. | 303/113.4 |
| 6,405,117 B1 * | 6/2002 | Walenty et al. | 701/70 |
| 6,422,125 B1 | 7/2002 | Fulks | |
| 6,439,186 B1 | 8/2002 | Owen et al. | |
| 6,574,959 B2 | 6/2003 | Fulks et al. | |
| 6,612,659 B2 * | 9/2003 | Fulks et al. | 303/113.4 |

* cited by examiner

Primary Examiner—John Tweel
(74) Attorney, Agent, or Firm—Michael D. Smith

(57) ABSTRACT

An intelligent input push rod assembly for applying an input force from a brake pedal to a power booster of a brake system. The input push rod assembly includes a sensor that is capable of generating an electrical output having a magnitude that varies with the amount of force applied to the input push rod by the brake pedal. Preferably, the sensor generates an output voltage signal that is generally proportional to the input force applied to the input push rod. A shunt is provided so that springs associated with the sensor operate in a generally linear force-deflection operating range of the springs. The output signal generated by the sensor is applied to a brake light control system that is supported by the input push rod assembly. The brake light control system uses the signal generated by the sensor to determine whether the vehicle brake lights should be illuminated and also to cause direct illumination of the brake lights during a braking operation.

4 Claims, 5 Drawing Sheets

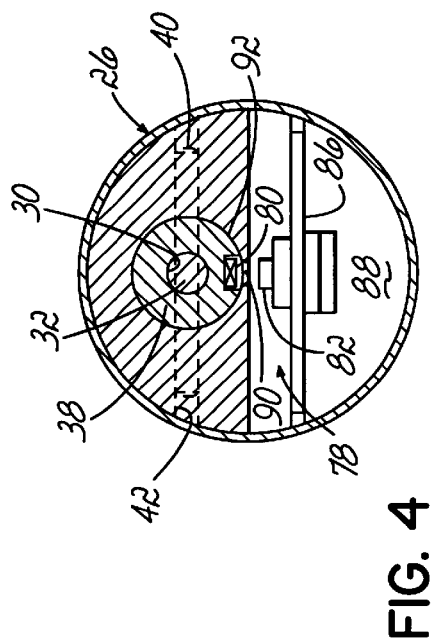
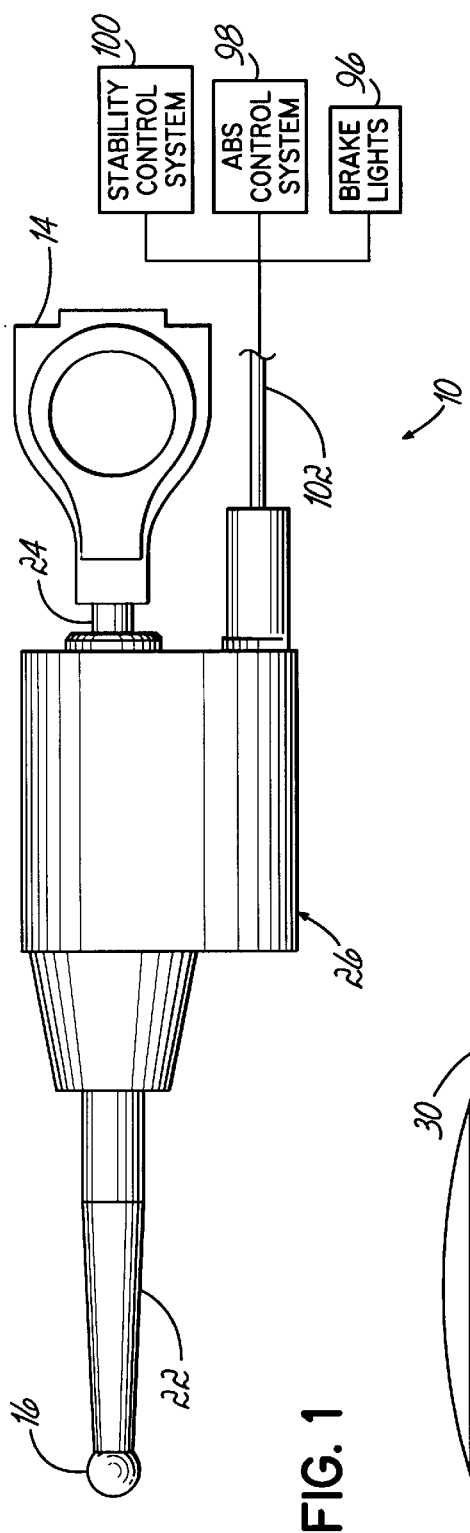
FIG. 1
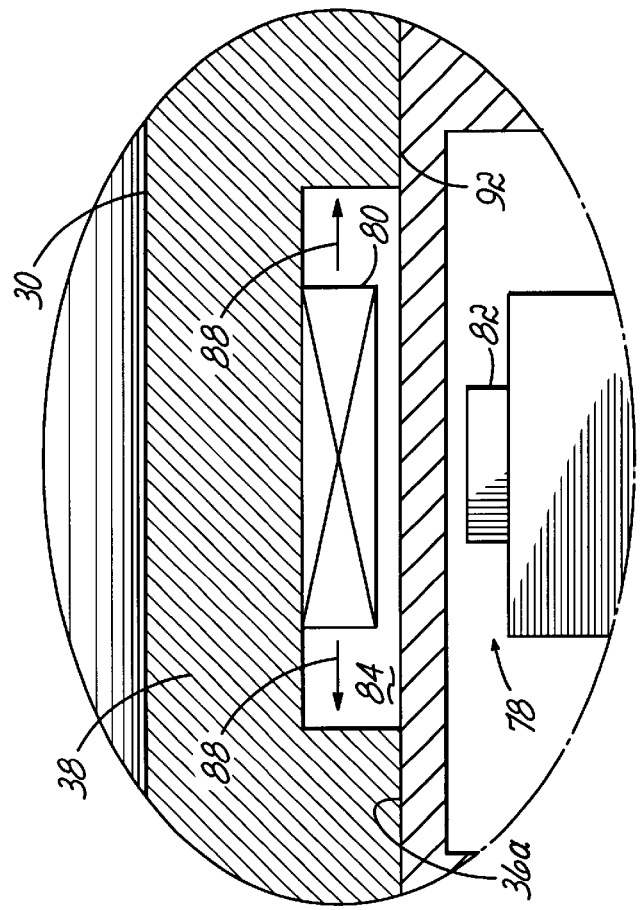
FIG. 4
FIG. 3

METHOD OF CALIBRATING AN INTELLIGENT INPUT PUSH ROD ASSEMBLY

CROSS-REFERENCE

The present application is related to commonly owned U.S. Pat. No. 09/940,928, filed on Aug. 28, 2001, now U.S. Pat. No. 6,612,659 and U.S. Pat. No. 09/941,036, filed on Aug. 28, 2001.

FIELD OF THE INVENTION

The present invention generally relates to power boosters for vehicle brake systems and, more particularly, to an input push rod for applying an input force from a brake pedal to the power booster.

BACKGROUND OF THE INVENTION

Brake power boosters generally utilize fluid pressure, or differentials thereof, to provide a power assist in applying force to the master cylinder of the brake system. Upon application of an input force on the brake pedal, an input member such as a push rod activates the power booster. The power booster intensifies the force applied to the input push rod by a calibrated amount and transfers the force to a power piston which then moves the master cylinder to apply the brakes at each wheel.

In the past, brake power boosters have incorporated electromechanical switches as part of the booster structure to cause illumination of the vehicle brake lights upon movement of the input rod. For example, power boosters have been designed that include an electrical circuit coupled to the brake illumination control system that causes illumination of the brake lights when the normally-open circuit is closed by a switch. The switch is typically biased in an open position and, in response to travel of the input push rod upon an input force being applied to the brake pedal, moves to a closed position to complete an electrical circuit that illuminates the brake lights. The brake illumination control circuit that includes a brake light driver circuit that causes illumination of the brake lights in response to closing of the electromechanical switch. The brake light driver circuit is typically separated or mounted remotely from the input push rod, and is electrically coupled to the electromechanical switch through an electrical cable.

Brake light control systems that use electromechanical switches to cause illumination of the vehicle brake lights have several drawbacks. For example, the brake booster and input push rod must be designed with additional structures for housing the switch arrangement and for attaching the switch actuation components to the input push rod. These additional structures increase the required space of the power booster which can give rise to installation difficulties when space is limited. Mounting of the brake illumination control system remotely from the input push rod and its associated electromechanical switch requires additional space and electrical connections within the vehicle.

Additionally, the electromechanical switch must be factory calibrated or adjusted to ensure that the brake lights are not illuminated when the input push rod is in a rest position, but are properly illuminated in response to a predetermined limited travel of the input push rod upon a force being applied to the brake pedal. Further, electromechanical switches used in brake light control systems may cause false illumination of the brake lights when the switch is jostled or the driver unintentionally causes travel of the input push rod in a non-braking situation.

For these general reasons, it would be desirable to provide a brake power booster system that accurately and reliably illuminates brake lights of a vehicle in response to a driver's input on a brake pedal during a braking situation.

SUMMARY OF THE INVENTION

The present invention overcomes the foregoing and other shortcomings and drawbacks of brake systems heretofore known and, more particularly, of brake light control systems for causing illumination of brake lights. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, an intelligent input push rod assembly is adapted to be operatively coupled at one end to a brake pedal and at an opposite end to a power booster of a brake system. The input push rod assembly is capable of applying a force to the power booster that is intensified and applied to a master cylinder of the brake system through a power piston and force output rod to apply the brakes at each wheel.

In accordance with one aspect of the present invention, the input push rod assembly includes a sensor that is capable of generating an electrical output having a magnitude that varies with the amount of force applied to the input push rod assembly by the brake pedal. The sensor generates an output voltage signal having a magnitude that is generally proportional to the input force applied to the input push rod assembly by the brake pedal. The output voltage signal generated by the sensor is applied to a brake light illumination system that is supported by the input push rod assembly. The brake light illumination system is operable to directly illuminate the brake lights of a vehicle in response to the output voltage signal generated by the sensor. In this way, the Input push rod assembly is an integral assembly that imparts an input force to the power booster to initiate a braking operation and includes the necessary brake light driver hardware to directly illuminate the brake lights.

The input push rod assembly includes a pair of elongated input push rod members and a housing member operatively connecting the pair of input push rod members so that the input push rod members extend generally along a common axis. The input push rods are biased for movement relative to each other by a spring and shunt assembly mounted within the housing member. In one embodiment of the present invention, the spring and shunt assembly comprises a pair of rigid shunt members that cooperate with a pair of respective Belleville springs to bias the input push rods for movement relative to each other along the common axis in response to an input force applied to the input push rod assembly. The shunt members are operable to limit compression or deflection of the Belleville springs through a generally linear force-deflection range of the springs so that the input push rods will move relative to each other only in the generally linear force-deflection operating range of the Belleville springs.

In accordance with another aspect of the present invention, the sensor comprises a rare earth magnet and a linear hall effect transducer that are mounted generally within the housing member. The magnet is mounted or affixed to one of the input push rods, and the linear hall effect transducer is mounted or affixed to a printed circuit board mounted to the housing member. The magnet and transducer are mounted offset from the common axis and in confronting relationship so that the magnet is mounted for reciprocal movement along a path parallel to and offset from the common axis, and the transducer is fixedly mounted adjacent the path of reciprocal movement. In response to movement of the input push rods relative to each other, the sensor is operable to generate the output voltage signal having a magnitude that varies with the amount of force applied to the input push rod assembly by the brake pedal.

The brake light illumination system coupled to the sensor includes a controller that executes an algorithm to perform two functions: (1) to calibrate a brake pedal rest position or brake pedal rest force so that the sensor is automatically compensated for temperature variations, vehicle pedal assembly mechanical tolerance differences and brake pedal assembly component wear; and (2) to determine whether a sufficient brake force has been applied to the input push rod assembly to cause direct illumination of the brake lights, thereby assuring that a predetermined force has been applied to the brake pedal before the brake lights are illuminated, and to turn the brake lights off at all other times.

The above features and advantages of the present invention will be better understood with reference to the accompanying figures and detailed description.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 1 is a side elevational view of an intelligent input push rod assembly in accordance with the principles of the present invention for applying an input force to a power booster of a brake system and for activating a vehicle's brake lights during a braking situation;

FIG. 3 is an enlarged view of the encircled area 3 shown in FIG. 2, illustrating a force sensor in accordance with the principles of the present invention;

FIG. 4 is a cross-sectional view taken along line 4—4 of FIG. 2;

DETAILED DESCRIPTION OF THE PREFERRED EMBODIMENT

Figure 2:
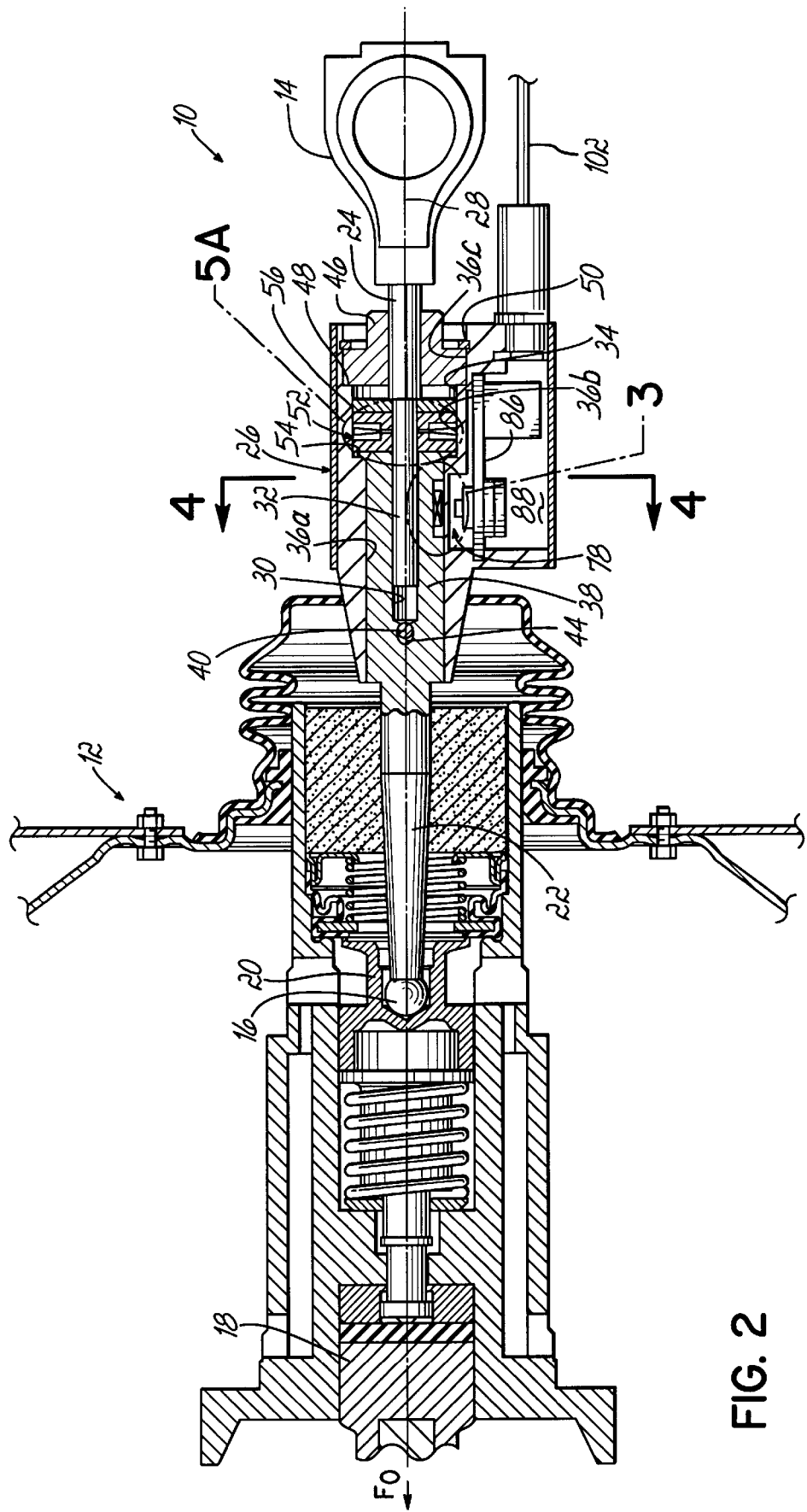
FIG. 2 is a partial cross-sectional view of the input push rod assembly shown in FIG. 1, and further illustrating the input push rod assembly operatively connected to a power booster of a brake system.

With reference to the Figures and to FIGS. 1 and 2 in particular, an input push rod assembly 10 in accordance with the principles of the present invention is shown connected to a power booster 12 (FIG. 2) of a brake system, such as a power booster used in an automobile. Input push rod assembly 10 has one end 14 adapted to be connected to a brake pedal (not shown) and another end 16 adapted to be connected to the power booster 12 so that input forces $F_1$ applied to the input push rod assembly 10 through the brake pedal (not shown) will generate intensified output forces $F_O$ to be applied to the master cylinder (not shown) of the brake system through force output rod 18 (FIG. 2) as is well known in the art. The power booster 12 intensifies the input force applied by the input push rod assembly 10 by a calibrated amount and transfers the force to a power piston 20 (FIG. 2) which then moves the master cylinder (not shown) to apply the brakes at each wheel.

Power booster 12 may comprise a duel diaphragm vacuum operated booster utilizing vacuum and atmospheric pressure differentials to boost input forces $F_1$ generating intensified output forces $F_O$, however the present invention is also applicable to systems with a single diaphragm vacuum booster and with power boosters operating with other power sources without departing from the spirit and scope of the present invention. An exemplary dual diaphragm power booster for use with the present invention is fully disclosed in U.S. Pat. No. 6,006,649, owned by the common assignee, and hereby expressly incorporated herein by reference in its entirety to which the reader is referred.

In accordance with the principles of the present invention, input push rod assembly 10 includes a pair of elongated input push rod members 22 and 24 that are operatively connected by a housing member 26 so that the input push rod members 22 and 24 preferably extend substantially along a common axis 28 (FIG. 2) and are effectively biased relative to each other as will be described in detail below. As shown in FIG. 2, input push rod 22 includes an elongated cylindrical bore 30 near its rearward end (i.e, the end facing away from the power booster 12) that slidably receives a forward cylindrical portion 32 of the input push rod 24 so that the input push rods 22 and 24 are mounted for movement relative to each other as described in detail below.

Further referring to FIG. 2, housing member 26 includes an elongated stepped bore 34 that extends longitudinally therethrough. The stepped bore 34 includes a forward cylindrical bore 36a formed near the forward end of the housing member 26 (i.e, the end facing the power booster 12), an inner cylindrical bore 36b, and a rearward cylindrical bore 36c formed near the rearward end of the housing member 26 (i.e., the end facing away from the power booster 12). The diameter of the stepped bore 34 decreases from the rearward cylindrical bore 36c having the largest diameter to the forward cylindrical bore 36a having the smallest diameter. The inner cylindrical bore 36b has a diameter intermediate the diameters of the rearward and forward cylindrical bores 36c and 36a, respectively.

As shown in FIG. 2, the forward cylindrical bore 36a slidably receives a rearward cylindrical portion 38 of the input push rod 22. As shown in FIGS. 2 and 4, a pin 40 extends transversely through the housing member 26 in a transverse bore 42. The pin 40 is captured in an elongated slot 44 (FIG. 2) formed in the input push rod 22 so that rotation of the input push rod 22 about the common axis 28 is prevented, and the fore and aft travel or stroke of the input push rod 22 within the cylindrical bore 36a of housing member 26 is limited by cooperation of the pin 40 with fore and aft stops defined by the elongated slot 44 formed in the input push rod 22.

The input push rod 24 is threadably connected to a nut 46 that is retained within the cylindrical bore 36c between an annular shoulder 48 of the stepped bore 34 and a retaining ring 50. In this way, the input push rod 24 is fixedly mounted to the housing member 26 for movement therewith toward and way from the power booster 12 in response to forces applied to the input push rod assembly 10 by a brake pedal.

In accordance with one aspect of the present invention, the input push rods 22 and 24 are biased for movement relative to each other by a spring and shunt assembly 52 mounted within the inner cylindrical bore 36b. The spring and shunt assembly 52 is mounted between an annular shoulder 54 of the stepped bore 34 and an annular disk 56 that is secured to the forward cylindrical portion 32 of the input push rod 24. In one embodiment of the present invention, as shown in FIGS. 5A and 5B, the spring and shunt assembly 52 comprises a pair of rigid shunt members 58 that cooperate with a pair of respective Belleville springs 60 to bias the input push rods 22 and 24 for movement relative to each other along the common axis 28.

Each Belleville spring 60 has a larger diameter end 62 and a smaller diameter end 64 that deflects toward the larger diameter end 62 during compression of the spring 60 under a load applied along a compression axis, such as along the common axis 28 in accordance with one embodiment of the present invention as shown. Each Belleville spring 60 has a free length "1" (FIG. 5A) (i.e., a non-compressed length) and a fully compressed length along the compression axis. Each of the shunt members 58 includes a shunt body 66 that extends along the compression axis and has an abutment surface 68 that is positioned intermediate the free length and the fully compressed length of each respective spring 60 so that the abutment surface 68 is positioned inwardly of the smaller diameter end 64 of each spring 60 in an uncompressed state as shown in FIG. 5A.

In one embodiment, each shunt member 58 comprises a tubular sleeve 70 that is mounted about the forward cylindrical portion 32 of the input push rod 24 and extends within the respective Belleville spring 60 so that the spring 60 surrounds and is supported on the tubular sleeve 70. Each shunt member 58 has an annular flange 72 that extends radially outwardly from the tubular sleeve 70 proximate one end thereof that is operable to engage the larger diameter end 62 of the respective Belleville spring 60.

Figure 5A:
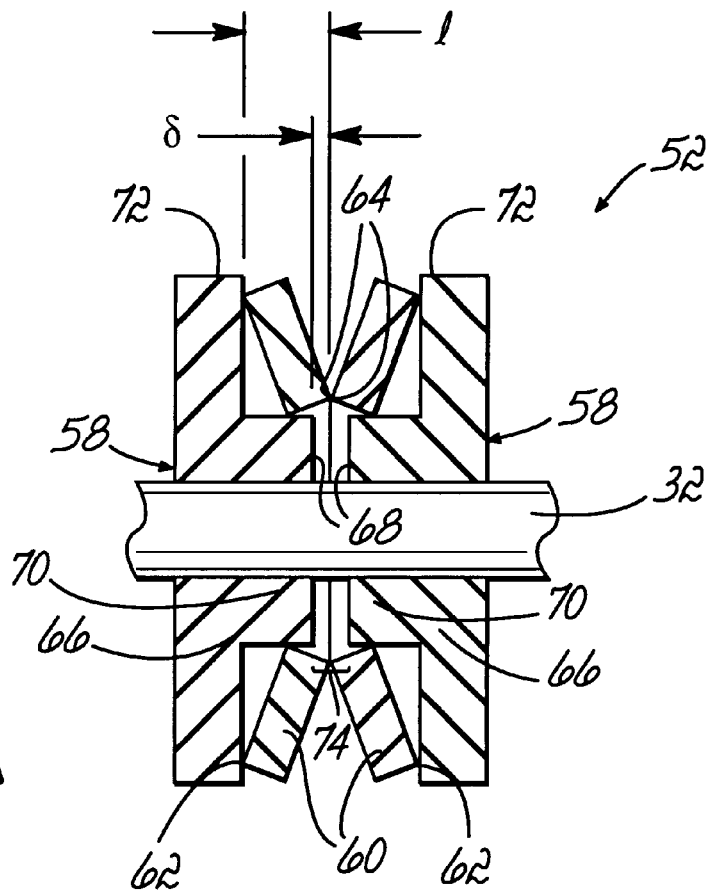
FIG. 5A is an enlarged view of the encircled area 5A shown in FIG. 2, illustrating a spring and shunt assembly in accordance with the principles of the present invention.
Figure 5B:
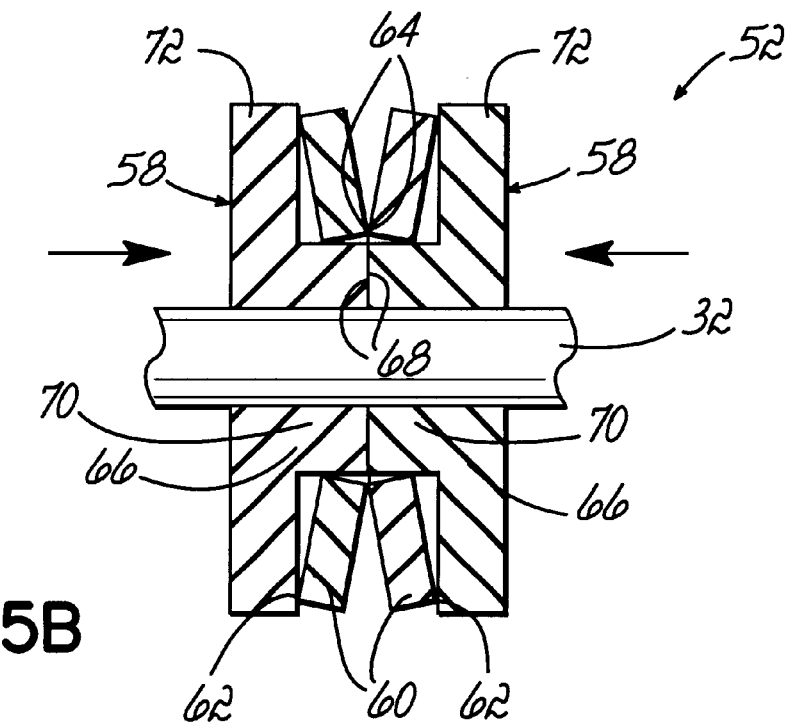
FIG. 5B is a view similar to FIG. 5A illustrating the spring and shunt assembly under an applied load.

Further referring to FIGS. 2, 5A and 5B, the pair of shunt members 58 are positioned to face each other so that the respective smaller diameter ends 64 of the Belleville springs 60 engage each other to form a gap 74 (FIG. 5A) between the respective abutment surfaces 68 of the shunt bodies 66. In response to a force applied to the input push rod assembly 10 by a brake pedal, the housing member 26 and its connected input push rod 24 are translated forwardly toward the power booster 12. As this occurs, the housing member 26 and its connected input push rod 24 move relative to the input push rod 22 as the spring and shunt assembly 52 is compressed between the rearward cylindrical portion 38 of the input push rod 22 and the annular disk 56 connected to the forward cylindrical portion 32 of the input push rod 24, as shown in FIG. 5B.

During compression of the spring and shunt assembly 52, the gap 74 formed between the respective abutment surfaces 68 of the shunt bodies 66 closes until the abutment surfaces 68 engage each other as shown in FIG. 5B. Thereafter, continued application of an input force on the input push rod assembly 10 is shunted through the shunt members 58 so that the input force is transmitted to the input push rod 22 without further compression of the Belleville washers 60.

Figure 6:
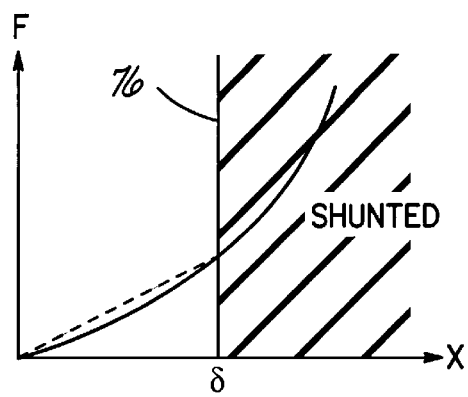
FIG. 6 is a graph illustrating input force applied to the spring of FIGS. 5A and 5B versus compression distance of the spring until the compression is shunted.

It will be appreciated by those of ordinary skill in the art that Belleville springs 60 exhibit a generally linear force-deflection characteristic over a limited deflection range of the spring, as illustrated in FIG. 6. For example, as shown in FIG. 6, the Belleville springs 60 exhibit a generally linear force-deflection characteristic up to a spring deflection distance "δ". In accordance with the principles of the present invention, each shunt member 58 is operable to limit compression or deflection of the Belleville spring 60 to the deflection distance "δ" (see FIG. 5A) in response to a force applied to the input push rod assembly 10 by a brake pedal. Further deflection of the Belleville springs 60 beyond the deflection limit "δ" is shunted by shunt members 58, as indicated by the shaded area 76 in FIG. 6. In this way, the input push rods 22 and 24 will move relative to each other only during the generally linear force-deflection operation of the Belleville springs 60.

In accordance with another aspect of the present invention, a sensor 78, preferably in the form of a rare earth magnet 80 (FIG. 3) and a linear hall effect transducer 82 (FIG. 3), is mounted generally within the housing member 26. In one embodiment of the present invention as shown in FIG. 2, the magnet 80 is mounted or affixed within a slot 84 formed in the rearward cylindrical portion 38 of the input push rod 22, and the linear hall effect transducer 82 is mounted or affixed to a printed circuit board 86 (FIGS. 2 and 4) that is mounted within a cavity 88 (FIGS. 2 and 4) of the housing member 26. As shown in FIGS. 2 and 4, the magnet 80 and transducer 82 are each mounted offset from the common axis 28 and in confronting relationship so that the magnet 80 is mounted for reciprocal movement along a path 88 (FIG. 2) that is parallel to and offset from the common axis 28, and the transducer 82 is fixedly mounted adjacent the path of reciprocal movement. An elongated slot 90 (FIG. 4) of sufficient width is formed in a wall 92 of the housing member 26 to permit electromagnetic communication between the magnet 80 and the transducer 82 during operation of the sensor 78.

Figure 8:
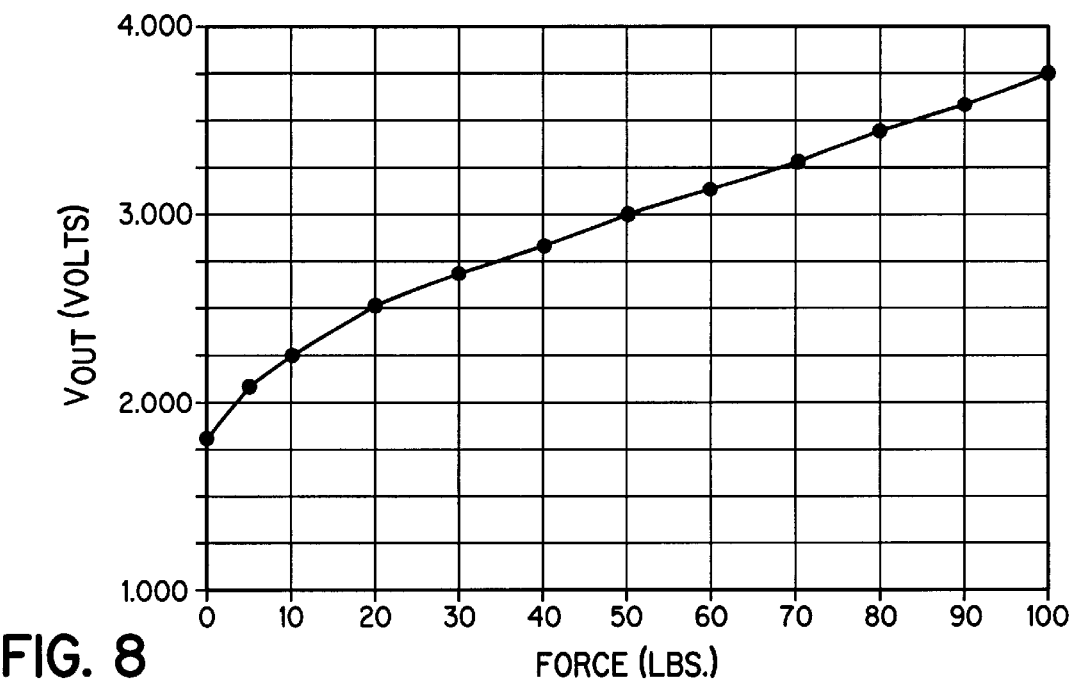
FIG. 8 is a graph illustrating output voltage of the force sensor versus input force applied to the input push rod assembly from a brake pedal in accordance with the principles of the present invention.

Sensor 78 is operable to generate an electrical output that varies in magnitude with the amount of force applied to the input push rod assembly 10 through the brake pedal (not shown), as illustrated by the graph of FIG. 8 that shows the output voltage of the sensor 78 versus the input force applied to input push rod assembly 10. As shown in FIG. 8, the output voltage ($V_{OUT}$) of sensor 78 is generally proportional to the input force applied to the input push rod assembly 10 over a range of input forces, such as between 0 and about 100 lbs., by way of example.

Figure 10:
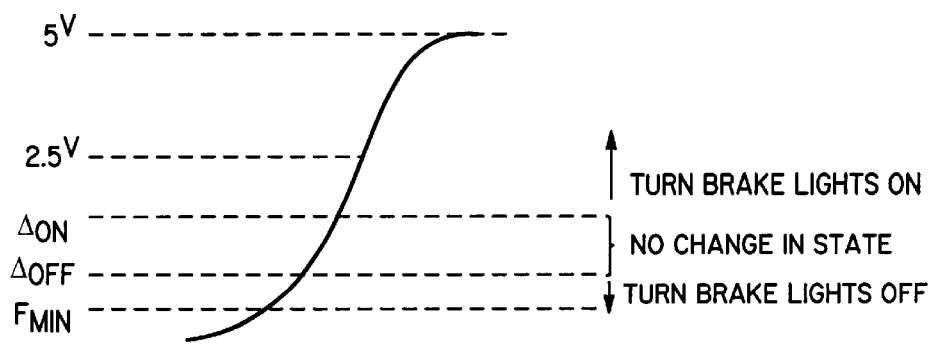
FIG. 10 is a graph illustrating output voltage of the force sensor versus displacement in accordance with the principles of the present invention.

As the input force on the input push rod assembly 10 increases, the magnet 80 and the transducer 82 move relative to each other due to the relative movement of the input push rods 22 and 24 as described in detail above. As the length of the magnet 80 travels past the transducer 82 in response to an input force applied to the input push rod assembly 10, the output voltage of the transducer 82 increases as illustrated by the graph of FIG. 10 that shows the output voltage of transducer 82 versus the position of the magnet 80 relative to the transducer 82. Of course, it will be appreciated that the orientation of the magnet 80 and transducer 82 can be reversed, and the mounting of the magnet 80 and transducer 82 relative to the common axis 28, can be changed without departing from the spirit and scope of the present invention.

While magnet 80 and linear hall effect transducer 82 are shown and described in connection with a preferred embodiment of the sensor 78, other sensors having electrical outputs that will vary in magnitude generally proportionally with the amount of force applied to the input push rod assembly 10 are possible as well.

Figure 7:
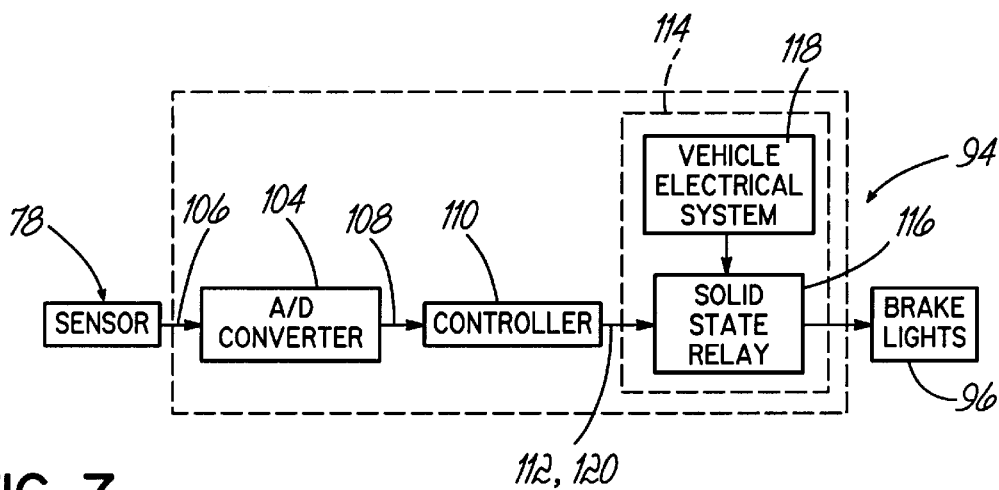
FIG. 7 is a block diagram of a brake light illumination system in accordance with the principles of the present invention.

In accordance with yet another aspect of the present invention, as shown in FIGS. 2 and 7, the electrical output signal generated by the transducer 82 is preferably applied to a brake light illumination system 94 that is mounted on the printed circuit board 86 supported by the housing member 26. As shown in FIG. 1, the brake light illumination system 94 is coupled to brake lights 96, an anti-lock braking control system (ABS) 98 and a vehicle stability control system 100 of a vehicle through electrical leads 102 extending from the housing member 26.

As will be described in detail below, the brake light illumination system 94 is operable to directly illuminate the brake lights 96 of a vehicle in response to an output signal generated by the transducer 82. As used herein, the term "directly illuminate" is used to describe that the brake illumination system 94, in accordance with one embodiment of the present invention, has the capability to activate the brake lights 96 through an output signal applied to the brake lights 96 through the electrical leads 102 without further processing of the output signal through a brake light driver circuit (not shown) mounted separately from the input push rod assembly 10. Additionally, the anti-lock braking control system (ABS) 98 and vehicle stability control system 100 may receive the output signal generated by the sensor 82, and use this force-related data for controlling other important vehicle functions as well.

Referring to FIG. 7, the brake light illumination system 94 includes an A/D converter 104 (FIG. 7) that converts an analog voltage output signal 106 generated by the transducer 78 into a digital signal 108. The digital signal 108 is applied as an input to a controller 110 of the brake light illumination system 94 which includes logic described in detail below in connection with FIGS. 9 and 10 to determine whether a sufficient brake force has been applied to the input push rod assembly 10 to cause illumination of the brake lights 96. The magnitude of the digital signal 108 applied to the controller 110 at which the brake lights 96 are illuminated may be chosen to correspond to an input force on the input push rod assembly 10 that is indicative of an intended braking action by the driver. If a sufficient input force has been applied, the controller 110 generates an output signal 112 that is applied to a brake light driver circuit 114 mounted on the printed circuit board 86 that forms part of the brake light illumination system 94.

The brake light driver circuit 114 includes a normally-open solid state relay 116 that is coupled to the vehicle's electrical system 118. In response to the output signal 112 generated by the controller 110, the brake light driver circuit 114 closes the solid state relay 116 to couple the vehicle's electrical system 118 to the brake lights 96 to thereby illuminate the brake lights 96 during a braking operation. After the braking operation, the controller 110 applies an output signal 120 to open the solid state relay 116 and thereby disconnect the vehicle's electrical system 118 from the brake lights 96 to turn the brake lights 96 off.

Figure 9:
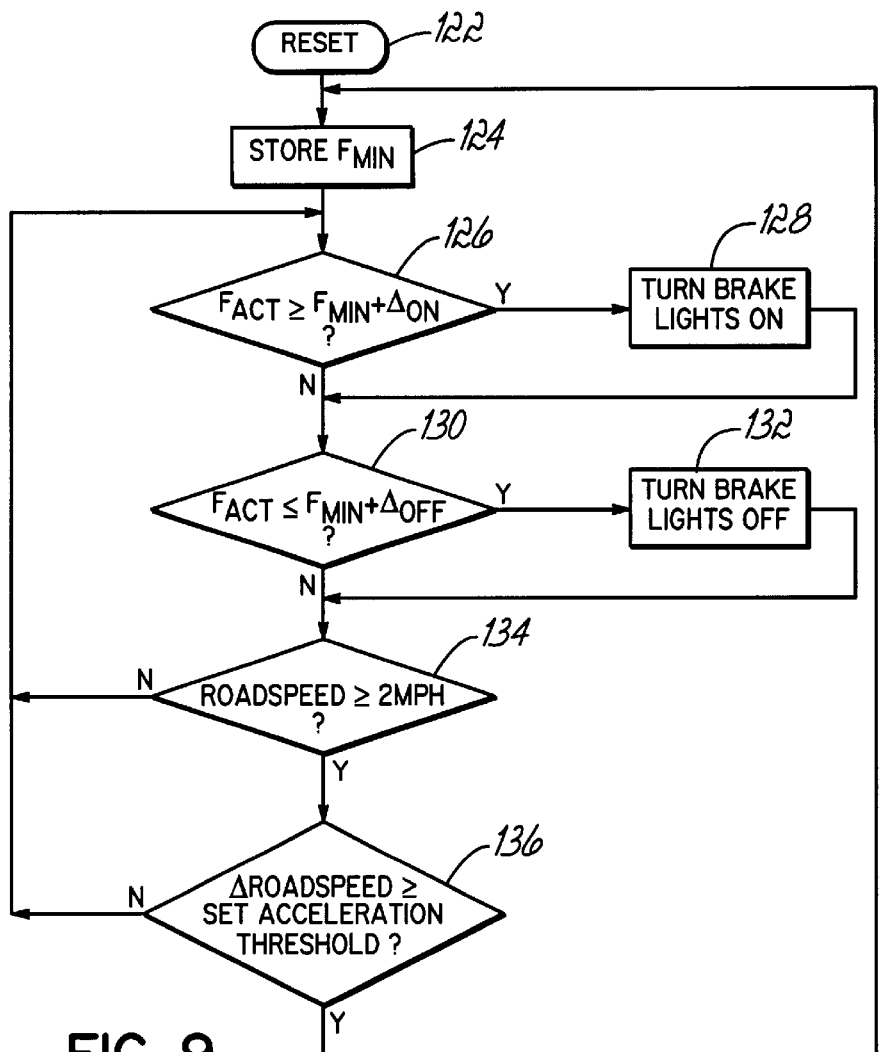
FIG. 9 is a flow diagram illustrating process steps for calibrating a brake pedal rest position or brake pedal rest force in the brake light illumination system of FIG. 7.

As shown in FIG. 9, the controller 110 executes an algorithm to perform two functions: (1) to calibrate a brake pedal rest position or brake pedal rest force so that the sensor 78 is automatically compensated for temperature variations, vehicle pedal assembly mechanical tolerance differences and brake pedal assembly component wear; and (2) to determine whether a sufficient brake force has been applied to the input push rod assembly 10 to cause direct illumination of the brake lights 96, thereby assuring that a predetermined force has been applied to the brake pedal (not shown) before the brake lights 96 are illuminated, and to turn the brake lights 96 off at all other times.

Referring to FIGS. 9 and 10, at step 122, the controller 110 is initially reset when the vehicle's key is turned to the "on" position. When the vehicle's key is turned to the "on" position, the controller 110 initially stores or recalls at step 124 a previously determined brake rest force "$F_{MIN}$" value that represents a force on the brake pedal when it is at a rest position, i.e., the driver is not applying any force to the brake pedal. The value "$F_{MIN}$" is determined by the output voltage of the sensor 78 that corresponds to the force applied to the input push rod assembly 10 as described in detail above.

At step 126, the controller 110 determines whether the actual force "$F_{ACT}$" on the input push rod assembly 10, indicated by the output voltage of the sensor 78, is greater than or equal to the sum of the brake pedal rest force "$F_{MIN}$" and a predetermined offset voltage "$\Delta_{ON}$". If so, the controller 110 causes illumination of the brake lights 96 at step 128 as described in detail above. Otherwise, at step 130, the controller 110 determines whether the actual force "$F_{ACT}$" on the input push rod assembly 10, indicated by the output voltage of the sensor 78, is less than or equal to the sum of the brake pedal rest force "$F_{MIN}$" and a predetermined offset voltage "$\Delta_{OFF}$". If so, the controller 110 causes the brake lights 96 to turn off at step 132 as described in detail above.

If the actual force "$F_{ACT}$" on the input push rod assembly 10, indicated by the output voltage of the sensor 78, is not less than or equal to the sum of the brake pedal rest force "$F_{MIN}$" and the predetermined offset voltage "$\Delta_{OFF}$" as determined at step 130, the controller 110 next determines at step 134 whether the vehicle's roadspeed is greater than or equal to a predetermined vehicle speed value, such as 2 MPH, thereby indicating that the vehicle is moving.

If the measured roadspeed is greater than or equal to the predetermined roadspeed value as determined at step 134, the controller 110 next determines at step 136 whether the vehicle is accelerating at an acceleration rate that is greater than or equal to a predetermined acceleration value, thereby indicating that the driver is not applying any input force to the input push rod assembly 10. If so, the controller 110 stores the force on the brake pedal at step 124 as a new "$F_{MIN}$" value that represents a calibrated brake pedal rest force value for use by the algorithm executed by the controller 110. In this way, the sensor 78 is automatically calibrated during operation of the vehicle to compensate for temperature variations, vehicle pedal assembly mechanical tolerance differences and brake pedal assembly component wear. As those of ordinary skill in the art will appreciate, the voltage output of the sensor 78 provides an indicia of the brake pedal rest position or, alternatively, the brake pedal rest force since both the brake pedal rest position and brake pedal rest force are related to the voltage output of the sensor 78.

The effect of the algorithm executed by controller 110 is illustrated in FIG. 10. If the actual force "$F_{ACT}$" on the input push rod assembly 10, indicated by the output voltage of the sensor 78, is greater than or equal to the sum of the brake pedal rest force "$F_{MIN}$" and the predetermined offset voltage "$\Delta_{ON}$", the controller 110 causes illumination of the brake lights 96. The brake lights 96 will remain illuminated until the actual force "$F_{ACT}$" on the input push rod assembly 10, indicated by the output voltage of the sensor 78, is less than or equal to the sum of the brake pedal rest force "$F_{MIN}$" and the predetermined offset voltage "$\Delta_{OFF}$". Therefore, the state of the brake lights 96 does not change if "$F_{ACT}$" is greater than the sum of the brake pedal rest force "$F_{MIN}$" and the predetermined offset voltage "$\Delta_{OFF}$" and less than the sum of the brake pedal rest force "$F_{MIN}$" and the predetermined offset voltage "$\Delta_{ON}$". In this way, undesirable flickering of the brake lights 96 is avoided.

While the present invention has been illustrated by a description of a preferred embodiment and while this embodiment has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein

We claim:

1. A method of calibrating a brake pedal rest position in a vehicle brake light activation system, comprising:

sensing a position of the brake pedal according to a predetermined indicia;

sensing an acceleration of the vehicle;

comparing the sensed acceleration of the vehicle with a predetermined acceleration threshold stored in memory; and storing the sensed position of the brake pedal in memory as a brake pedal rest position if the sensed acceleration of the vehicle at least equals the predetermined acceleration threshold.

2. The method of claim 1, further comprising the steps of:

sensing a traveling speed of the vehicle;

comparing the sensed traveling speed with a predetermined traveling speed threshold stored in memory; and comparing the sensed acceleration of the vehicle with the predetermined acceleration threshold only if the sensed traveling speed of the vehicle at least equals the predetermined traveling speed threshold.

3. A method of calibrating a brake pedal rest force in a vehicle brake light activation system, comprising:

sensing a force on the brake pedal according to a predetermined indicia;

sensing an acceleration of the vehicle;

comparing the sensed acceleration of the vehicle with a predetermined acceleration threshold stored in memory; and storing the sensed force on the brake pedal in memory as a brake pedal rest force if the sensed acceleration of the vehicle at least equals the predetermined acceleration threshold.

4. The method of claim 3, further comprising the steps of:

sensing a traveling speed of the vehicle;

comparing the sensed traveling speed with a predetermined traveling speed threshold stored in memory; and comparing the sensed acceleration of the vehicle with the predetermined acceleration threshold only if the sensed traveling speed of the vehicle at least equals the predetermined traveling speed threshold.

* * * * *